United States Patent
Baxamusa et al.

(10) Patent No.: US 11,740,454 B2
(45) Date of Patent: Aug. 29, 2023

(54) ETCHING OF WATER-SENSITIVE OPTICS WITH WATER-IN-OIL EMULSIONS

(71) Applicant: Lawrence Livermore National Security, LLC, Livermore, CA (US)

(72) Inventors: Salmaan H. Baxamusa, Livermore, CA (US); John Adams, Livermore, CA (US); Paul Ehrmann, Hughson, CA (US); Ted Laurence, Livermore, CA (US); Marlon G. Menor, Ceres, CA (US); Kathleen I. Schaffers, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 397 days.

(21) Appl. No.: 16/954,990

(22) PCT Filed: Mar. 26, 2018

(86) PCT No.: PCT/US2018/024369
§ 371 (c)(1),
(2) Date: Jun. 17, 2020

(87) PCT Pub. No.: WO2019/190465
PCT Pub. Date: Oct. 3, 2019

(65) Prior Publication Data
US 2021/0003841 A1 Jan. 7, 2021

(51) Int. Cl.
*G02B 1/00* (2006.01)
*G02B 27/00* (2006.01)
*B06B 1/02* (2006.01)
*C09K 13/00* (2006.01)

(52) U.S. Cl.
CPC ............ *G02B 27/0006* (2013.01); *B06B 1/02* (2013.01); *C09K 13/00* (2013.01); *B06B 2201/70* (2013.01)

(58) Field of Classification Search
CPC ... G02B 27/0006; B06B 1/02; B06B 2201/70; C09K 13/00
See application file for complete search history.

(56) References Cited

U.S. PATENT DOCUMENTS

| 3,340,195 | A | * | 9/1967 | Paulf | C23F 1/42 134/2 |
| 8,313,662 | B2 | | 11/2012 | Miller et al. | |
| 2004/0055994 | A1 | * | 3/2004 | Miwa | C03C 15/00 216/2 |
| 2005/0176844 | A1 | * | 8/2005 | Aasen | A61K 51/08 523/118 |
| 2011/0079931 | A1 | | 4/2011 | Miller et al. | |

(Continued)

OTHER PUBLICATIONS

International Preliminary Examination Report from PCT Application No. PCT/2018/24369, dated Oct. 8, 2020.

(Continued)

*Primary Examiner* — Euncha P Cherry
(74) *Attorney, Agent, or Firm* — Zilka-Kotab P.C.

(57) ABSTRACT

In one inventive concept, a method for etching an optic includes obtaining a microemulsion, where the microemulsion includes a continuous oil phase, a surfactant system comprising at least one surfactant, and water, submerging at least a portion of the optic in the microemulsion, and agitating by ultrasonication the microemulsion for etching the optic submerged therein.

20 Claims, 6 Drawing Sheets

(56) References Cited

U.S. PATENT DOCUMENTS

| | | | | |
|---|---|---|---|---|
| 2011/0105661 A1* | 5/2011 | Aksman | ............... | C08J 3/02 |
| | | | | 524/199 |
| 2012/0288464 A1* | 11/2012 | Carmichael | ............... | C08F 2/32 |
| | | | | 424/70.16 |
| 2014/0193945 A1* | 7/2014 | Li | ............... | H01L 21/31111 |
| | | | | 252/79.4 |
| 2016/0035587 A1* | 2/2016 | Keech | ............... | H01L 21/4803 |
| | | | | 216/90 |

OTHER PUBLICATIONS

Gao et al., "Experimental Study on Abrasive-Free Polishing for KDP Crystal," Journal of the Electrochemical Society, vol. 157, No. 9, Jul. 9, 2010, pp. H853-H856.

Sangwal et al., "On the Selective Etching of KDP Crystals," Journal of Crystal Growth, vol. 58, 1982, pp. 261-266.

Wang et al., "Water-in-Oil Dispersion for KH2P04 (KDP) Crystal CMP," Journal of Dispersion Science and Technology, vol. 31, Nov. 28, 2010, pp. 1611-1617.

Wang et al., "A water dissolution method for removing microwaviness caused by SPOT process on KDP crystals," International Journal of Advneed Manufacturing Technology, Nov. 6, 2015, 14 pages.

Kumar et al., "Structural Features of Water-in-Oil Microemulsions," Journal of Physical Chemistry, vol. 84, 1980, pp. 1895-1899.

International Search Report and Written Opinion from PCT Application No. PCT/2018/24369, dated Jun. 7, 2018.

Extended European Search Report from European Application No. 18911982.9, dated Aug. 17, 2021.

Dong et al., "KDP Aqueous Solution-in-Oil Microemulsion for Ultra-Precision Chemical-Mechanical Polishing of KDP Crystal," Materials, vol. 10, 2017, pp. 1-8.

* cited by examiner

3:2 Triton X-100:Hexanol Surfactant

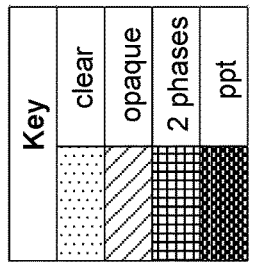
FIG. 6A
FIG. 6B

| Key | | | |
|---|---|---|---|
| | clear | ppt | no test |

Shake

| wt% KDP in water | 0 wt% | 1 wt% | 2 wt% | 3 wt% | 4 wt% | 6 wt% | 8 wt% | 10 wt% | 12 wt% |
|---|---|---|---|---|---|---|---|---|---|
| KDP in solution | | | | | | | | | |
| KDP solid | | | | | | | | | |

FIG. 7A

Shake and Sonicate

| wt% KDP in water | 0 wt% | 1 wt% | 2 wt% | 3 wt% | 4 wt% | 6 wt% | 8 wt% | 10 wt% | 12 wt% |
|---|---|---|---|---|---|---|---|---|---|
| KDP in solution | | | | | | | | | |
| KDP solid | | | | | | | | | |

FIG. 7B

ETCHING OF WATER-SENSITIVE OPTICS WITH WATER-IN-OIL EMULSIONS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to methods of etching optics, and more particularly, this invention relates to methods and formulations for etching water-sensitive optics.

BACKGROUND

Optics used in high-fluence laser environments are susceptible to damage by local optical absorption thereby leading to thermally-activated runaway and, ultimately, mechanical fracture. Electronic defects of the optics associated with impurities or fractured surfaces tend to cause the damaging local optical absorption. In practice, the most problematic defects are found at the surface (rather than within the bulk) of the optic. Moreover, the defects tend to be byproducts of manufacturing processes.

Processes to remove the defects have been challenging to develop. For fractured surfaces, several processes, e.g. laser machining, mechanical machining, chemical mechanical polishing, etc., involve locally removing material so that the fracture may be replaced by a smooth surface with no electronic defects. However, such processes are only effective when the defects on an optic leading to damage are a) large enough to be identified and b) present at a low number density to be economical. In other words, if the optical surface has a high density of defects needing removing by laser or mechanical machining, the costs for the repair may be too expensive.

For small defects scattered over an optical surface, using local material removal techniques is an impractical approach for repairing damage for improving laser performance. Alternatively, controllably removing, or etching, material from the entire surface of the optic using a liquid-based process may be a more robust approach. This liquid-based etching approach does not depend on the size or number density of defects initially present on the optical surface.

Moreover, it would be desirable to etch an optic isotropically without flattening the surface such that material on the optic may be removed uniformly from an uneven surface thereby leaving the surface uneven following the etching process. Local removal of material by machining and chemical machining processing is limiting because only the protruding portions of the optic may be removed.

Contemplated approaches have shown that chemically etching fused silica with aqueous hydrofluoric acid removes defects and creates a nearly defect-free surface. However, etching fluids for water-sensitive crystalline optics, such as potassium dihydrogen phosphate (KDP), have remained elusive. It has been challenging to develop a formulation that may dissolve the optic slowly in order to prevent uncontrolled dissolution while removing enough material to remove defects from the surface. Water is an effective etchant for KDP, however water dissolves KDP far too rapidly and thus is not useful for minimal etching of KDP optics.

It would be desirable to develop a system of using a liquid formulation for etching water-sensitive optics for removing defects on the surface of the optic to improve the performance of optics used in high-fluence laser environments.

SUMMARY

In one inventive concept, a method for etching an optic includes obtaining a microemulsion, where the microemulsion includes a continuous oil phase, a surfactant system comprising at least one surfactant, and water, submerging at least a portion of the optic in the microemulsion, and agitating by ultrasonication the microemulsion for etching the optic submerged therein.

In another inventive concept, a system for etching an optic includes a chamber, a solution in the chamber, where the solution is a microemulsion comprising a continuous oil phase, at least one surfactant, and water, and an ultrasonic device, where the ultrasonic device is configured to agitate the solution in the chamber.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 6A is a summary of observations of formulations following shaking, according to inventive concepts described herein.

FIG. 6B is a summary of observations of formulations following shaking and sonicating, according to inventive concepts described herein.

FIG. 7A is a summary of observations of formulations including 6 wt % water following shaking, according to inventive concepts described herein.

FIG. 7B is a summary of observations of formulations including 6 wt % water following shaking and sonicating, according to inventive concepts described herein.

DETAILED DESCRIPTION

Figure 1:
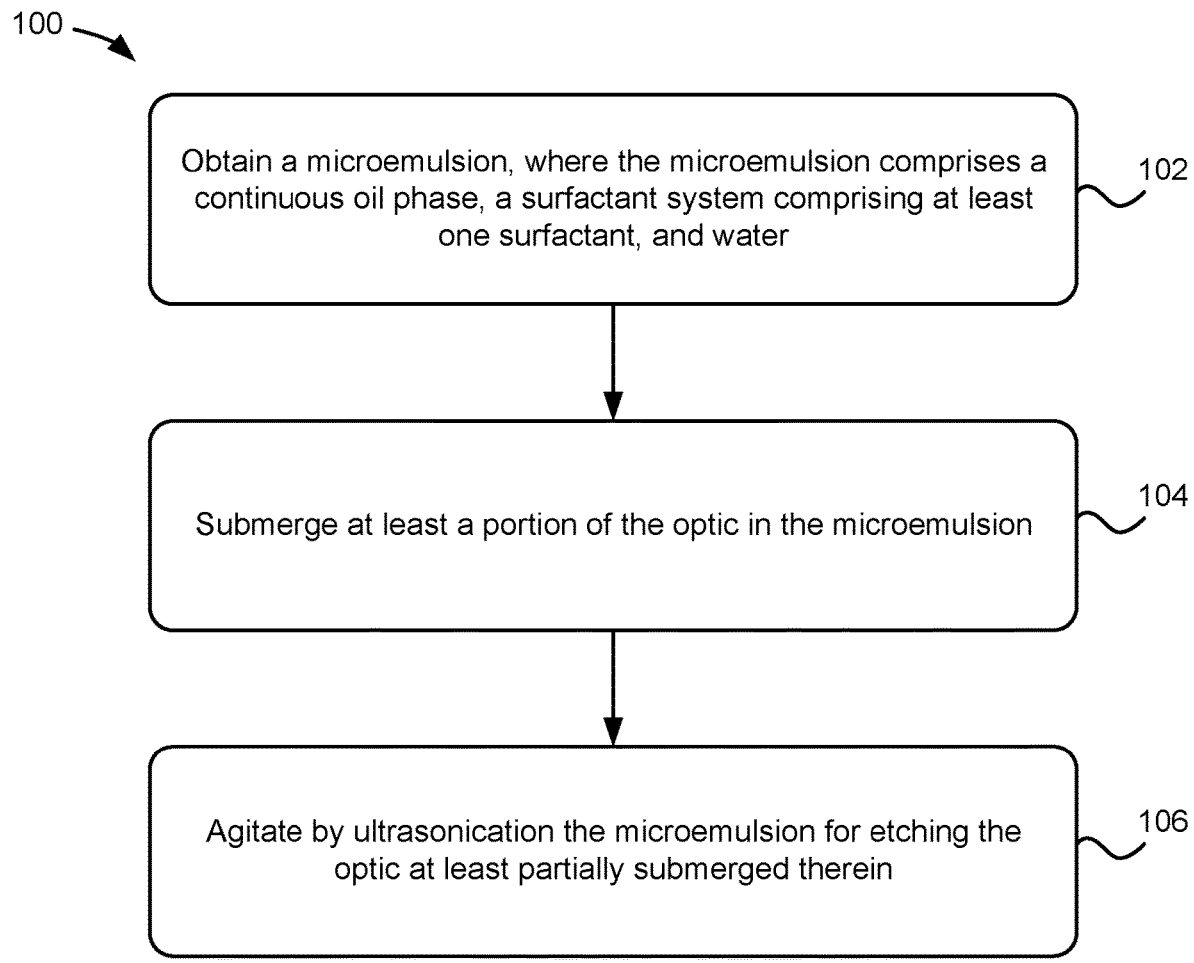
FIG. 1 is a flow chart of a method, according to inventive concepts described herein.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" when combined with a value refers to plus and minus 10% of the reference value. For example, a length of about 1 μm refers to a length of 1 μm±0.1 μm.

It is also noted that, as used in the specification and the appended claims, wt % is defined as the percentage of weight of a particular component is to the total weight of the mixture. Moreover, mol % is defined as the percentage of moles of a particular component is to the total moles of the mixture.

The following description discloses several preferred inventive concepts for etching of water-sensitive optics with water-in-oil emulsions and/or related systems and methods.

In one general inventive concept, a method for etching an optic includes obtaining a microemulsion, where the microemulsion includes a continuous oil phase, a surfactant system comprising at least one surfactant, and water, submerging at least a portion of the optic in the microemulsion, and agitating by ultrasonication the microemulsion for etching the optic submerged therein.

In another general inventive concept, a system for etching an optic includes a chamber, a solution in the chamber, where the solution is a microemulsion comprising a continuous oil phase, at least one surfactant, and water, and an ultrasonic device, where the ultrasonic device is configured to agitate the solution in the chamber.

A list of acronyms used in the description is provided below.

BBO Beta barium borate
C Celsius
CLBO Cesium lithium borate
CMP Chemical mechanical polishing
CTAB Cetyl trimethylammonium bromide
D Deuterium
$D_2O$ Deuterated water
g gram
H Hydrogen
KDP Potassium dihydrogen phosphate
LBO Lithium borate
mg mg
ml milliliters
nm nanometer
SDS Sodium dodecyl sulphate
μm micron, micrometer
wt % weight percent In various inventive concepts described herein, etching an optic includes removing surface material of the optic without changing the shape of the optic. In some approaches, etching the optic may result in a polishing effect on the optic surface. In various inventive concepts, the entire surface of an optic may be etched using a method that allows uniform material removal from the surface rather than a method of of smoothing the material in essentially one direction, e.g. polishing, as used in optical wavefront quality processes. A controlled material removal of optical surfaces in a suitable etchant may improve the performance of optics used in high-fluence laser environments. In particular, potassium dihydrogen phosphate (KDP) crystal is an excellent nonlinear optical crystal for uses in frequency conversion devices and electro-optic switches. However, KDP crystals are difficult to process due to the extreme softness of the crystal and its sensitivity to water dissolution.

In inventive concepts described herein, the solubility of KDP in a microemulsion may be controlled at low levels, thereby suggesting that the microemulsion as described herein may be a suitable working fluid for water-soluble crystal optics. In various inventive concepts described herein, a microemulsion-based etching fluid forms nano-sized (~5 nm) droplets of water dispersed in an inert continuous oil phase, e.g. hydrocarbon carrier, oil, etc. Moreover, the microemulsion with agitation by ultrasonication, as described herein, allows etching of the surface of the optic isotropically without flattening the surface. In other words, material on the optic may be removed uniformly from the uneven surface of the optic thereby leaving the surface uneven following the etching process. This allows us to remove material from the optic without changing the overall shape of the optic. Furthermore, the process as described herein involves the activation of the microemulsion volumetrically rather than using the microemulsion solely between a polishing pad and the optic, as used in conventional microemulsion processes.

Moreover, water-sensitive optics may be etched to remove extraneous surface material using methods as described herein. For example, and not meant to be limiting in any way, the methods described herein may etch the surface of water-sensitive optics that have varying degrees of water solubility, such as lithium borate (LBO), beta barium borate (BBO), cesium lithium borate (CLBO), etc.

FIG. 1 shows a method 100 for etching of water-sensitive optics with water-in-oil emulsions. As an option, the present method 100 may be implemented for processing structures such as those shown in the other FIGS. described herein. Of course, however, this method 100 and others presented herein may be used to process structures which may or may not be related to the illustrative concepts listed herein. Further, the methods presented herein may be carried out in any desired environment. Moreover, more or less operations than those shown in FIG. 1 may be included in method 100. It should also be noted that any of the aforementioned features may be used in any of the embodiments described in accordance with the various methods.

Microemulsions are commonly used in cosmetics, oil recovery, catalysis, and industrial washing. A microemulsion is a formulation having an oil, water, surfactant, and co-surfactant. As a mixture, the oil and water are not miscible and form two distinct liquid phases. The addition of the surfactant and co-surfactant lowers the interfacial free-energy between the oil and water sufficiently such that the oil and water may spontaneously form a single liquid phase. Moreover, microemulsions tend to be thermodynamically stable, thus the formulation does not merely slow the separation of oil and water into distinct phases but also alters the free energies to the extent that mixing of the two into a single phase tends to be preferred.

The method 100 for etching an optic begins with operation 102 of obtaining a microemulsion, where the microemulsion includes a continuous oil phase, a surfactant system comprising at least one surfactant, and water. The microemulsion may be formed in some approaches, purchased in other approaches, etc.

In some approaches, the surfactant system includes a surfactant and, optionally, a co-surfactant, and may be present to disperse the water in the continuous oil phase. In various inventive concepts described herein, a microemulsion may be a "water-in-oil" emulsion in which the oil is the continuous phase (e.g. carrier) and water is the dispersed phase. In various approaches, the microemulsion includes an effective amount of the surfactant system to disperse the water in the continuous oil phase. In some approaches, the water-in-oil microemulsion forms reverse micelle. In preferred approaches, the microemulsion may be in a single isotropic phase.

In various approaches of the microemulsion described herein, the continuous oil phase may be present in the microemulsion in a range of about 60 wt % to about 90 wt % relative to a total weight of the microemulsion. In a preferred approach, the continuous oil phase may be present in the microemulsion in a range of about 70 wt % to about 85 wt % relative to a total weight of the microemulsion. Microemulsions having concentrations of the continuous oil phase below 60 wt % may result in uneven etching of the optic. If the continuous oil phase is too low then a macroscopic phase separation occurs (water and oil split) thereby causing the fluid to be impractical for use. Moreover, if the continuous oil phase falls even lower, a single phase may be recovered in which the water becomes the continuous phase thereby allowing the water to etch the water-sensitive optic without any control (e.g. etching at uncontrolled rate, etching too fast, etc.).

In various inventive concepts described herein, the continuous oil phase may be a nonpolar aprotic solvent. In some approaches, the continuous oil phase may include a linear alkane. In other approaches, the continuous oil phase may include a cyclic alkane. In preferred approaches, the continuous oil phase may include cyclohexane. In other approaches, the continuous oil phase may include toluene.

In various approaches of the inventive concepts described herein, the surfactant system may be present in the microemulsion in a range of about 10 wt % to about 40 wt % relative to a total weight of the microemulsion. In exemplary approaches, the surfactant system may be present in the microemulsion in a range of about 13 wt % to about 29 wt % relative to a total weight of the microemulsion. In approaches in which the surfactant system includes a surfactant and a co-surfactant, the surfactant system may have a ratio by weight of the surfactant to the co-surfactant of ≥3:2.

Figure 2A:
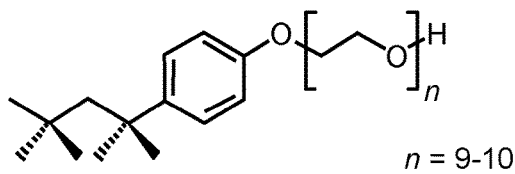
FIG. 2A is a schematic drawing of the surfactant Triton X-100.

In various approaches, the microemulsion obtained in operation 102 may include a surfactant system having a nonionic surfactant. Nonionic surfactants are preferred because the salt balance in the microemulsion tends to remain stable as the optic is etched. In exemplary approaches, the surfactant system includes nonionic surfactant polyethylene glycol tert-octylphenyl ether (Triton X-100, FIG. 2A). In other approaches, the surfactant system includes polyoxyethylene (5) nonylphenylether (Igepal CO-520). In other approaches, the surfactant system includes polysorbates (e.g. Tween).

In some approaches, the surfactant system may include ionic surfactants, such as, for example, sodium dodecyl sulphate (SDS), cetyl trimethylammonium bromide (CTAB), etc.

In some approaches, the co-surfactant may be a n-alcohol. In preferred approaches, the surfactant system includes hexanol (see FIG. 2B). In some approaches, the surfactant system may include butanol. In other approaches, the surfactant system may include pentanol.

In various approaches of inventive concepts described herein, the water may be present in the microemulsion in a range of greater than 0 wt % to about 10 wt % relative to total weight of the microemulsion. In some approaches, the etching rate of the optic material may be adjusted by modifying the amount of water present in the formulation and further, the concentration of water may be selected based on the water sensitivity of the optic material being etched. For example, for optic material with a high water sensitivity, less water may be included in the formulation and for optic material with a low water sensitivity; more water may be included in the formulation.

In some approaches, the inventive concepts described herein may include etching an optic of a deuterated version of KDP in which the KDP includes a larger amount of the hydrogen isotope deuterium (D) compared to the common hydrogen isotope (H). Thus, for etching an optic of a deuterated version of KDP, a microemulsion may include deuterated water (e.g. heavy water, deuterium oxide, $D_2O$). In some approaches, $D_2O$ may constitute all of the water phase. In other approaches, $D_2O$ may constitute part of the water phase.

Figure 3:
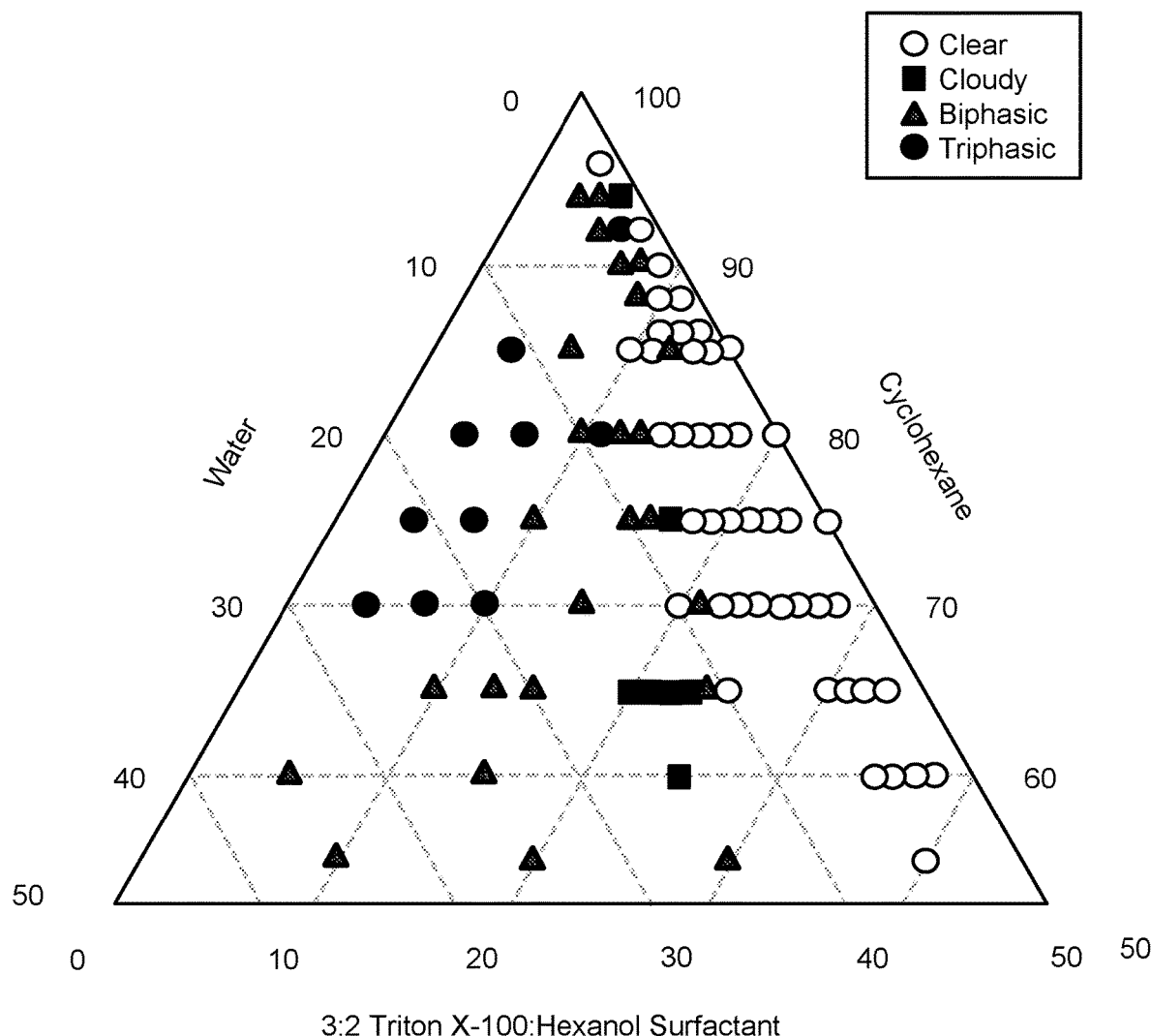
FIG. 3 is a ternary phase diagram of formulations, according to inventive concepts described herein.

FIG. 3 depicts a ternary phase diagram that may be used to map the preferred concentrations of the components of the microemulsion described herein. Exemplary examples of the inventive concepts described, and not meant to be limiting in any way, include formulations that form a single, isotropic phase (○, FIG. 3) in which the microemulsion tends to be clear. Also shown in FIG. 3, are the formulations that create a cloudy suspension (■), formulations that form a biphasic suspension (▲) and formulations that form a triphasic suspension (●).

In a preferred approach, a microemulsion includes cyclohexane as the oil, Triton X-100 (also known as polyethylene glycol tert-octylphenyl ether, FIG. 2A) as the surfactant, and 1-hexanol (FIG. 2B) as the co-surfactant. A preferred formulation of the microemulsion described herein includes (by mass) 10-40 wt % surfactant mixture (surfactant+co-surfactant), 0-10 wt % water, and a balance of continuous oil phase. In some approaches, the balance of continuous oil phase may include 60-90 wt % cyclohexane. An exemplary formulation of the microemulsion includes (by mass) 13-29 wt % surfactant mixture (surfactant+co-surfactant), 0-10 wt % water, and a balance of continuos oil phase. In some approaches, the balance of continuous oil phase may include 70-85 wt % cyclohexane.

Operation 104 of method 100 includes submerging at least a portion of the optic in the microemulsion. In some approaches, all of the optic may be submerged (e.g. suspended, immersed, etc.) in the microemulsion. In other approaches, part of the optic may be submerged in the microemulsion. In some approaches, the faces that are exposed to light of interest are preferably suspended in the microemulsion. According to inventive concepts described herein, all submerged portions of the optic may be exposed isotropically to the microemulsion and the agitation by ultrasonication.

Operation 106 of method 100 for etching an optic includes agitating by ultrasonication the microemulsion for etching the optic at least partially submerged therein. In various approaches, the ultrasonication may have a frequency in a range of about 20 kHz to about 300 kHz, but higher and lower frequencies may also be used in other approaches. As described in various inventive concepts herein, the agitation by ultrasonication of the entire volume of the microemulsion thereby provides a volumetric source for etching the submerged optic and offers the entire volume of microemulsion to interact with optic surface. In addition, the activation of the microemulsion on the optic surface may be controlled by turning on the agitation by ultrasonication to activate etching, and turning off the agitation to suspend etching. Further, the etching rate of the surface optic in the microemulsion may be tuned by controlling the time duration of agitation by ultrasonication.

An etch rate for etching an optic following the methods described herein may be defined by primary parameters. In one approach, the primary parameters include water content in the microemulsion, surfactant to water ratio in the microemulsion, the power of the ultrasonic agitation, and the ultrasonication frequency during agitation of the optic in the microemulsion. In preferred approaches, lower water content, lower power, and higher frequency may each result in slower etch rates. For example, and in no way meant to be limiting, in an exemplary approach of method 100, the preferable conditions of the primary parameters for an optimal etch rate of a KDP optic may include a microemulsion of 2 wt % water and 14:1 surfactant to water ratio, and ultrasonication having a power of 135 W and a frequency of 270 kHz.

Figure 4A:
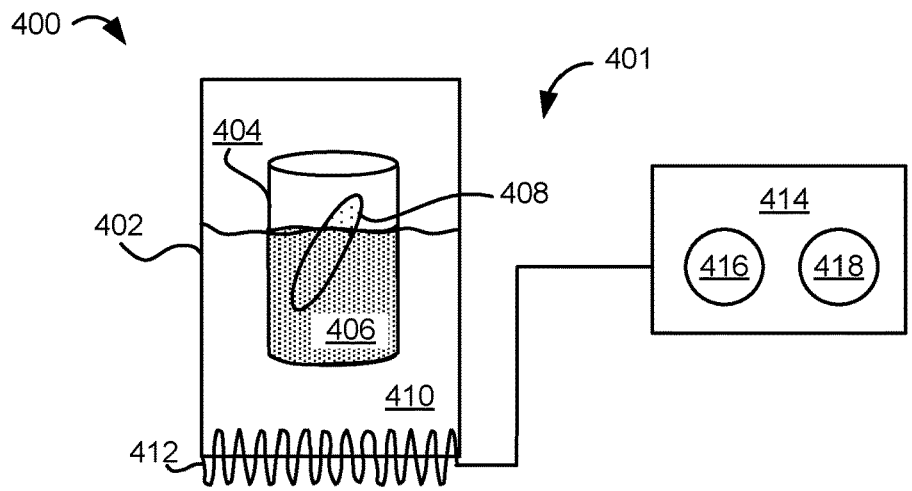
FIGS. 4A-4C are simplified schematic diagrams of a system, according to various inventive concepts described herein.

In various approaches, the ultrasonic device that performs the agitation by ultrasonication includes commercially available devices used in ultrasonication. As shown in the simplified drawings of FIGS. 4A to 4C, various ultrasonic devices may be used to perform the agitation of the microemulsion. In one approach, as shown in FIG. 4A, a system 400 may include an ultrasonic device 401 that includes an ultrasonic tank 402 with transducers 412 and a solution 410 (e.g. water) for immersing a chamber 404 containing the microemulsion 406 with the optic 408 submerged in the microemulsion 406. The ultrasonic tank 402 may be an ultrasonic bath that agitates the immersed chamber 404 with the microemulsion 406 with the submerged optic 408. The power 416 and frequency 418 of the transducers 412 may be adjusted by a controller 414. The agitation of the chamber 404 containing microemulsion 406 in ultrasonic tank 402 with transducers 412 may be turned on and turned off by the controller 414.

Figure 4B:
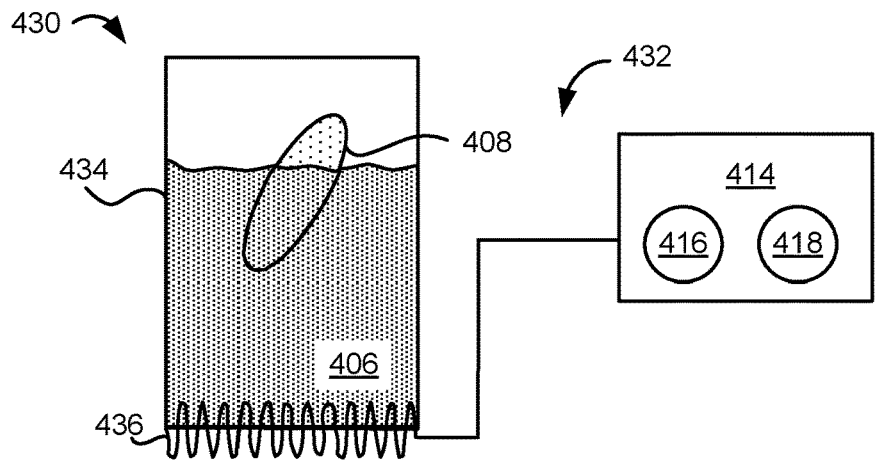

In another approach, as shown in FIG. 4B, a system 430 may include an ultrasonic device 432 of which the ultrasonic tank 434 may be a chamber that contains the microemulsion 406. Thus, the ultrasonic device may include an ultrasonic tank 434 with transducers 436 and a microemulsion 406 with an optic 408 submerged in the microemulsion 406. The ultrasonic tank 434 with transducers 436 may be the ultrasonic bath that agitates the microemulsion 406 and the submerged optic 408. The power 416 and frequency 418 of the transducers 436 may be adjusted by a controller 414. The agitation of the microemulsion 406 in ultrasonic tank 434 with transducers 436 may be turned on and turned off by the controller 414.

Figure 4C:
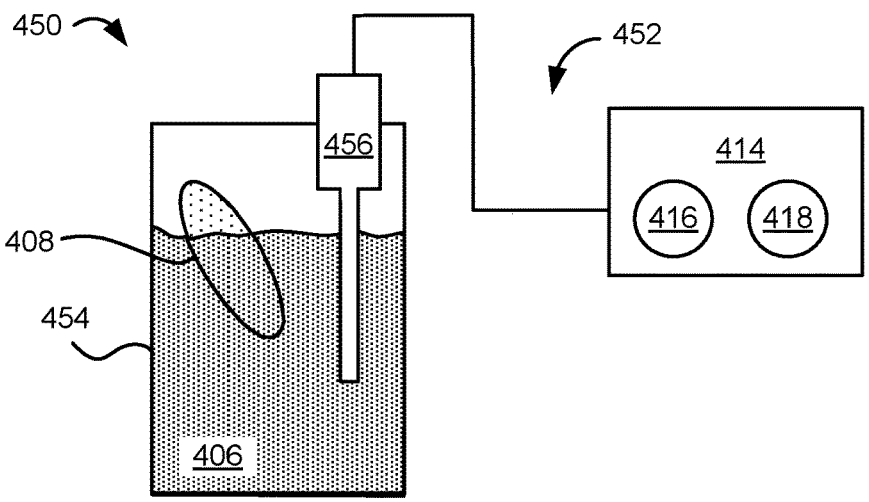

In yet another approach, as shown in FIG. 4C, a system 450 may include an ultrasonic device 452 of which the ultrasonic tank 454 may be a chamber that contains the microemulsion 406. Thus, the ultrasonic device 452 may include an ultrasonic tank 454 with a probe transducer 456. The ultrasonic tank 454 contains the microemulsion 406 with the submerged optic 408. The probe transducer 456 activates ultrasonication when submerged in the microemulsion 406 of the ultrasonic tank 454. The power 416 and frequency 418 of the probe transducer 456 may be adjusted by a controller 414. The agitation of the microemulsion 406 in the ultrasonic tank 454 by the probe transducer 456 may be turned on and turned off by the controller 414.

Of course, FIGS. 4A-4C are exemplary configurations of systems with ultrasonic devices, and any combination of components of ultrasonic devices as known in the art may be used for ultrasonication, particularly in an attempt to adhere to applications, as described herein. The invention is not meant to be limited to the device configurations described herein, but may include ultrasonic device configurations of any type as would be understood by one of skill in the art upon reading the present descriptions.

Following operation 106 of etching the optic in a microemulsion during ultrasonication, the etched optic may be rinsed with a non-etching solution for maintaining the quality of the optic. Illustrative examples of non-etching solution for rinsing the optic include isopropanol, toluene, cyclohexane, etc.

Figure 5:
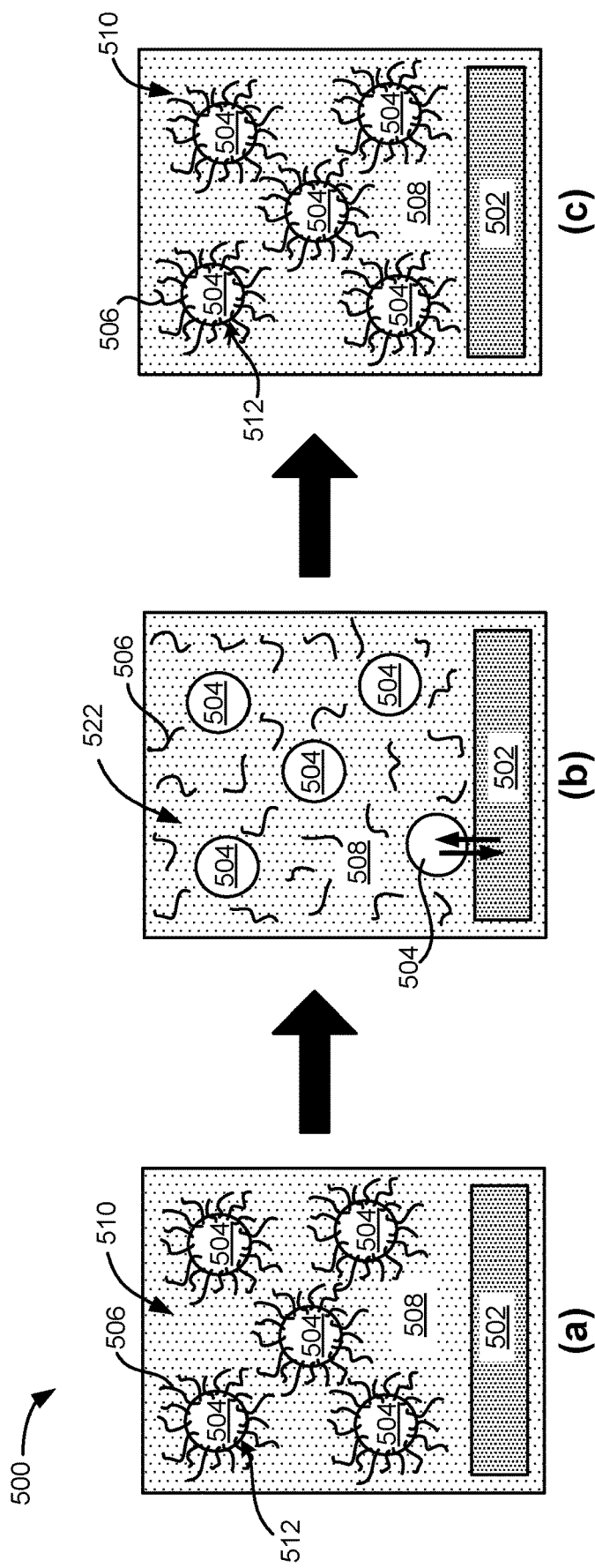
FIG. 5 is a simplified schematic diagram of a method, according to inventive concepts described herein.

FIG. 5 depicts a simplified schematic drawing of a method 500 of etching a water-sensitive KDP solid, in accordance with one inventive concept. As an option, the present method 500 may be implemented to construct structures such as those shown in the other FIGS. described herein. Of course, however, this method 500 and others presented herein may be used to form structures which may or may not be related to the illustrative concepts listed herein. Further, the methods presented herein may be carried out in any desired environment. Moreover, more or less operations than those shown in FIG. 5 may be included in method 500. It should also be noted that any of the aforementioned features may be used in any of the embodiments described in accordance with the various methods.

Figure 2B:
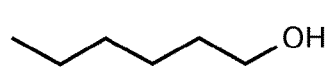
FIG. 2B is a schematic drawing of the co-surfactant 1-hexanol.

Part (a) of FIG. 5 depicts a simplified representation of a microemulsion 510 with a solid KDP 502. The microemulsion 510 includes a continuous oil phase 508, water 504 dispersed as droplets in the continuous oil phase 508, and surfactant molecules 506 surrounding the droplets of water 504. Dynamic light scattering data suggests that the hydrodynamic size of the dispersed droplets of water 504 may be about 5 nm diameter (e.g. nanosized domains). The presence of surfactant molecules 506, represented in the simplified diagram as both surfactant and co-surfactant molecules, introduces an interfacial surface tension thereby creating a microscopic interface 512 between the dispersed droplet of water 504 and the continuous oil phase 508 such that the interface 512 may be populated by surfactant molecules 506 (e.g. reverse micelles). The surfactant molecules 506 may sequester the droplets of water 504 and render the droplets of water 504 inactive, or incapable of solublizing activity, when the microemulsion is static or quiescent. In a preferred approach, the surfactant molecules 506 may represent a surfactant mixture of the surfactant Triton X-100 (FIG. 2A) and the co-surfactant hexanol (FIG. 2B).

Part (b) of FIG. 5 shows the disruption of the microemulsion into a solution 522 of individual components: a continuous oil phase 508 (e.g. cyclohexane), surfactant molecules 506, and water 204. The agitation releases the droplets of water 504 from the surfactant molecules 506 thereby allowing the water to cross the surfactant barrier and interact directly with the solid KDP 502 (arrows). Without wishing to be bound by any theory, it is believed that the agitation by ultrasonication may deform and/or disrupt the water droplets surrounded by surfactant molecules which in turn may allow the droplets of water to freely interact with the surface of the solid KDP. While the agitation is ongoing, the water dissolves (e.g. etches) the solid KDP 502 until the agitation by ultrasonication is turned off (e.g. stopped).

Part (c) of FIG. 5 shows the reforming of the microemulsion 510 once the agitation by ultrasonication is turned off (or stopped). The microemulsion 510 reforms spontaneously because of the inherent thermodynamic stability of the components of the microemulsion. The surfactant molecules 506 repopulate at the interface 512 between the water 504 and the continuous oil phase 508. The microemulsion becomes static, quiescent, etc. and the droplets of water 504 become inactive, thereby protecting the solid KDP 502 from interaction from the water 504.

In preferred approaches, following agitation by ultrasonication, the microemulsion with the submerged KDP tends to be essentially free of KDP precipitate that would be present in a continuous oil phase of the microemulsion. Thus, without wishing to be bound by any theory, it is believed that following agitation, the droplets of water 504 have the captured KDP molecules from the surface of the solid KDP 502. In other words, the KDP molecules that were dissolved by the released water during ultrasonication remain in the droplets of water and tend not to form a precipitate in the continuous oil phase of the microemulsion.

In preferred approaches, a water-soluble optic such as KDP may not dissolve rapidly when immersed in a formulation as described herein because during the quiescent state, the optic is in contact primarily with the oil phase. When the microemulsion is ultrasonically agitated, the water is liberated and free to interact with, and dissolve, the KDP. Removal of the ultrasonic stimulus then causes the microemulsion to re-form. According to various inventive concepts described herein, etching of a water-sensitive optic may be controlled remotely by activating ultrasonic stimulus, such that the etching may be turned on by turning on agitation by ultrasonication, and the etching may be turned off by turning off the agitation.

According to some inventive concepts described herein, a system for etching an optic may include a chamber, a solution in the chamber, where the solution may be a microemulsion that includes a continuous oil phase, at least one surfactant, and water. An ultrasonic device may be configured to agitate the solution in a chamber. In preferred approaches, the ultrasonic device may provide a frequency in a range of about 20 kHz to about 300 kHz.

In some approaches, the system may be scaled to accommodate large optics. For example, an array of ultrasonic transducers in a large bath of microemulsion (as described) may be implemented to provide a uniform acoustic field. Additional agitation (impeller, etc.) may also be included to prevent dead zones and to provide even etching of the optic immersed in the microemulsion.

EXPERIMENTS

Microemulsion Series

A microemulsion was prepared with an aqueous phase, an organic phase, and a surfactant mix. The aqueous phase included water at increasing wt % starting with 0 wt % to 12 wt % of total weight of microemulsion (e.g. 0 wt %, 2 wt %, 4 wt %, 6 wt %, 8 wt %, 10 wt %, and 12 wt %). The organic phase included cyclohexane at about 30 wt % of total weight of microemulsion. The surfactant mix included a ratio of 3:2 by weight of Triton X-100 and 1-hexanol as co-surfactant (see FIGS. 2A and 2B for structures), where the surfactant mix was about 10 wt % of total microemulsion.

Three sets of microemulsion series with increasing water wt % were tested by either shaking only or shaking followed by sonication. The first set included no added KDP to each sample of the first series, the second set included 4 wt % KDP in solution added to each sample of the second series, the third set included 4 wt % solid KDP added to each sample in the third series.

For comparison, FIG. 6A lists observations of the formulations after Shake, and FIG. 6B lists observations of the formulations after Shaking followed by Sonication. Observations included visual assessment of each sample in a clear vial thereby allowing distinction between four visual results: clear, opaque, 2 phases, or precipitate (see Key for FIGS. 6A and 6B).

It was observed that KDP precipitate (ppt) was present in the KDP solid samples with water at 2 wt %, 4 wt %, and 6 wt % after shaking (FIG. 6A) and after shaking followed by sonication (FIG. 6B). However, it was visually apparent that the amount of ppt present after shaking followed by sonication (FIG. 6B) decreased in amount (as indicated by the black arrow). Without wishing to be bound by any theory, it was believed that the decreasing ppt in the 2 wt % to 6 wt % water samples with solid KDP suggested that some of the solid KDP was captured in the aqueous portion of the micelles in the microemulsion after sonication had stopped.

Thus, a 6 wt % water in a microemulsion was tested as an optimal concentration of water in the microemulsion to allow controlled etching during sonication. In a separate experiment, a microemulsion including 6 wt % water was tested with 1 wt % (8 mg) solid KDP in water. After shaking the KDP in the microemulsion, the KDP remained insoluble in the microemulsion solution. Sonicating the microemulsion-6 wt % water with 1 wt % KDP for 5 minutes caused essentially all the KDP to dissolve into the microemulsion-6 wt % water solution. This result suggested the KDP resided in the aqueous portion of the micelle following sonication.

Further experiments tested the carrying capacity of solid KDP in a microemulsion with 6 wt % water. FIG. 7A depicts the visual observations of increasing wt % of KDP in a microemulsion with 6 wt % water following shaking. Two types of KDP were tested, KDP in solution and KDP solid. As shown in FIG. 7A, shaking the KDP in solution in the microemulsion, at KDP concentrations of 4 wt % and 6 wt %, caused the solution to become clear, whereas the solid KDP remained as a solid (as indicated by ppt) in all concentrations of solid KDP in the microemulsion with 6 wt % water. In both cases, above 8 wt % KDP, the KDP remained as a ppt in the microemulsion following shaking.

As shown in FIG. 7B, shaking followed by sonication of the microemulsion with 6 wt % water and increasing concentrations of KDP resulted in the solutions with solid KDP between 1 wt % and 6 wt % to dissolve in the microemulsion solution. Thus, these results suggested that the microemulsion with 6 wt % water may hold between 6 wt % and 8 wt % KDP, which may be equivalent to 0.42 wt % to 0.58 wt % KDP in the system.

In other experiments, solid KDP powder added to a microemulsion containing 6% water (by mass) did not rapidly dissolve. Upon ultrasonic agitation for 1 minute, the solid powder dissolved rapidly in the aqueous phase. Then, removal of the ultrasonic stimulus caused the microemulsion to reform into a single liquid phase in which the dissolved KDP was distributed among the dispersed nano-droplets of water.

TABLE 1

Primary parameters for controlling the etch rate of KDP

| | | Sonication | | | |
|---|---|---|---|---|---|
| Water mass % | Surfactant:Water mass:mass | Power Watts | Frequency kHz | Etch rate nm/min | Ratio* |
| 2.0 | 14:1 | 135 | 40 | 23 | 70 |
| 2.0 | 11.5:1 | 135 | 40 | 54 | 107 |
| 2.0 | 9:1 | 135 | 40 | 44 | 67 |
| 2.0 | 6.5:1 | 135 | 40 | 136 | 81 |
| 1.0 | 29:1 | 135 | 40 | 11 | n/m |
| 2.0 | 14:1 | 135 | 40 | 23 | 70 |
| 4.0 | 6.5:1 | 135 | 40 | 410 | 130 |
| 6.0 | 4:1 | 135 | 40 | 1500 | 210 |
| 2.0 | 14:1 | 135 | 40 | 77 | n/m |
| 2.0 | 14:1 | 135 | 140 | 39 | n/m |
| 2.0 | 14:1 | 135 | 270 | 13 | n/m |
| 2.0 | 14:1 | 480 | 270 | 92 | n/m |

*Ratio = etch rate during sonication versus etch rate without sonication.
n/m = not measured In another test, a 2 in×2 in optical crystal was placed in a quiescent microemulsion which demonstrated an etch rate of 1 m/min. A 2 in×2 in optical crystal placed in an ultrasonically agitated microemulsion demonstrated an etch rate of 6 m/min. The 6-fold increase in the etch rate may demonstrate that the ultrasonic agitation liberated water from its surfactant cage, thereby enhancing the ability of water to dissolve KDP.

Controlling the Etch Rate of KDP

Four primary parameters were identified for controlling the etch rate of KDP (as shown in Table 1): water content, surfactant:water (S:W) ratio, ultrasonic power, and sonication frequency. As shown, a lower water content, lower power, and higher frequency resulted in slower etch rates, for example, 2% water, 14:1 S:W ratio, 135 W, and 270 kHz resulted in a slow etch rate of 13 nm/min. The ratio in the far right column represents a ratio of the etch rate during sonication versus the etch rate without sonication. In the samples measured, this ratio represented the selectivity of the "on/off" switch of ultrasonication. A high ratio represented a clear difference between a high etch rate during sonication compared to a low etch rate without sonication. For example in the higher water concentrations where the etch rate was significant during sonication (see 6% water, 4:1 S:W ratio where the etch rate 1500 nm/min) showed a significant decrease as reflected in the ratio comparing the etch rate without sonication.

In Use

The microemulsion as described herein may be used as a working fluid for water-sensitive optics. In particular, the microemulsion may be used to controllably dissolve (etch) water-soluble crystal optics such as potassium dihydrogen phosphate (KDP).

Various embodiments described herein may be used for etching water sensitive optics in frequency conversion devices and electro-optic switches.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While inventive concepts have been described above, it should be understood that they have been presented by way of example only, and not limitation. Thus, the breadth and scope of the various aspects of the present invention should not be limited by any of the above-described exemplary approaches, but should be defined only in accordance with the following claims and their equivalents.

What is claimed is:

1. A method for etching an optic, the method comprising:
   obtaining a microemulsion, wherein the microemulsion comprises a continuous oil phase, a surfactant system comprising at least one surfactant, and water;
   submerging at least a portion of the optic in the microemulsion; and
   agitating by ultrasonication the microemulsion for etching the optic submerged therein.

2. The method as recited in claim 1, wherein the microemulsion comprises an effective amount of the surfactant system to disperse the water in the continuous oil phase.

3. The method as recited in claim 1, wherein the microemulsion is a water-in-oil emulsion.

4. The method as recited in claim 1, wherein the continuous oil phase is present in the microemulsion in a range of about 60 wt % to about 90 wt % relative to a total weight of the microemulsion.

5. The method as recited in claim 1, wherein the continuous oil phase is present in the microemulsion in a range of about 70 wt % to about 85 wt % relative to a total weight of the microemulsion.

6. The method as recited in claim 1, wherein the surfactant system is present in the microemulsion in a range of about 10 wt % to about 40 wt % relative to a total weight of the microemulsion.

7. The method as recited in claim 1, wherein the surfactant system is present in the microemulsion in a range of about 13 wt % to about 29 wt % relative to a total weight of the microemulsion.

8. The method as recited in claim 1, wherein the water is present in the microemulsion in a range of greater than 0 wt % to about 10 wt % relative to total weight of the microemulsion.

9. The method as recited in claim 1, wherein the surfactant system comprises the surfactant and a co-surfactant, wherein a ratio by weight of the surfactant to the co-surfactant is 3:2.

10. The method as recited in claim 9, wherein the co-surfactant is a n-alcohol.

11. The method as recited in claim 1, wherein the water is deuterated water ($D_2O$).

12. The method as recited in claim 1, wherein the microemulsion is in a single isotropic phase.

13. The method as recited in claim 1, wherein the continuous oil phase is a nonpolar aprotic solvent.

14. The method as recited in claim 1, wherein the continuous oil phase comprises a component selected from the group consisting of: toluene and cyclohexane.

15. The method as recited in claim 1, wherein the at least one surfactant includes a nonionic surfactant.

16. The method as recited in claim 1, wherein the surfactant system comprises at least one surfactant selected from the group consisting of: polyethylene glycol tert-octylphenyl ether and polyoxyethylene (5) nonylphenylether.

17. The method as recited in claim 1, wherein the ultrasonication has a frequency in a range of about 20 kHz to about 300 kHz.

18. A system for etching an optic, the system comprising:
   a chamber;
   a solution in the chamber, wherein the solution is a microemulsion comprising a continuous oil phase, at least one surfactant, and water; and
   an ultrasonic device, wherein the ultrasonic device is configured to agitate the solution in the chamber.

19. The system as recited in claim 18, wherein the ultrasonic device provides a frequency in a range of about 20 kHz to about 300 kHz.

20. The method as recited in claim 1, wherein a mass ratio of the surfactant system to the water is in a range of about 4:1 to about 14:1.

* * * * *